United States Patent
Fierston et al.

[15] 3,646,554
[45] Feb. 29, 1972

[54] VIDEO PULSE CONVERTER FOR THE TRACK SIGNAL PROCESSOR

[72] Inventors: Stanley A. Fierston, Swampscott; Bruce K. Nelson, Concord, both of Mass.

[73] Assignee: The United States of America as represented by the Secretary of the Army

[22] Filed: May 19, 1966

[21] Appl. No.: 552,384

[52] U.S. Cl. .........................................................343/5 DP
[51] Int. Cl. ..............................................................G01s 9/02
[58] Field of Search ...............................343/5 DP; 340/172.5

[56] References Cited

UNITED STATES PATENTS

| | | | |
|---|---|---|---|
| 3,059,228 | 10/1962 | Beck et al. | 340/172.5 X |
| 3,221,309 | 11/1965 | Benghiat | 340/172.5 |
| 3,229,276 | 1/1966 | Harple et al. | 340/172.5 X |
| 3,315,258 | 4/1967 | Dillard | 343/5 DP |

*Primary Examiner*—Malcolm F. Hubler
*Attorney*—Harry M. Saragovitz, Edward J. Kelly, Herbert J. Berl and Robert C. Sims

[57] ABSTRACT

Precision and verification track processors receive radar information from receivers which may be fed by a test target generator. The analog outputs of the processors are simultaneously applied to a multiplexer. The analog output of the multiplexer is converted by an analog to digital converter whose output is fed through an output buffer to control switch buffer and to a computer. A track gate generator, a discrimination gate generator, and the test target generator are all controlled by the control switch buffer. The gate generators in turn control the operation of the processors, multiplexer, analog to digital converter, and output buffer.

6 Claims, 10 Drawing Figures

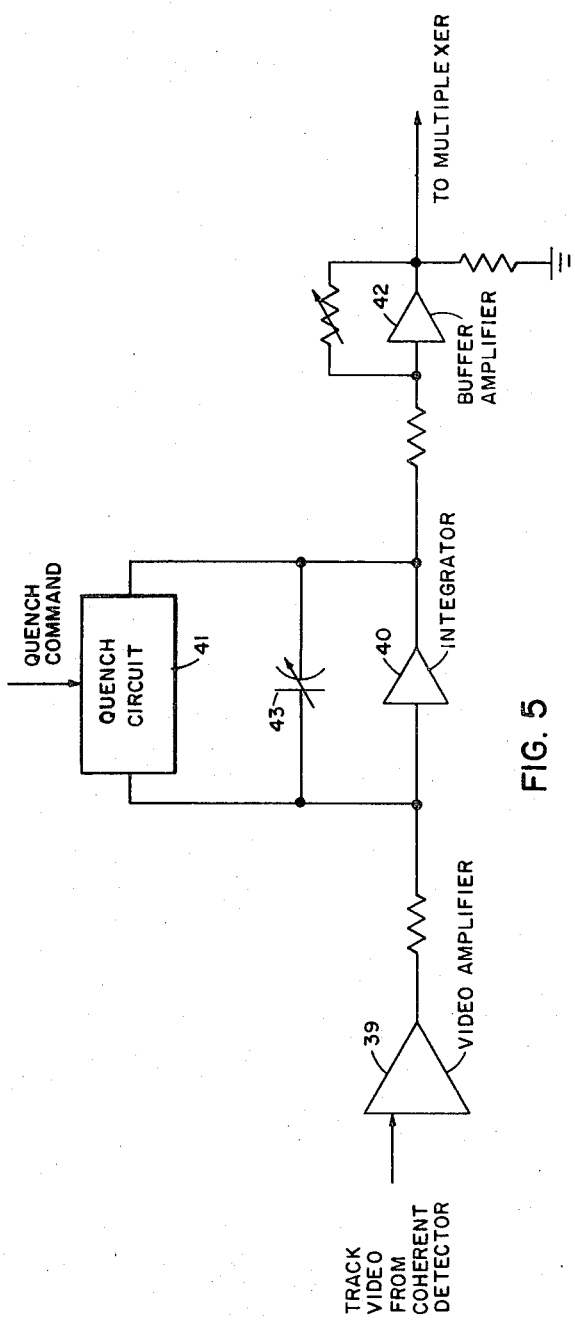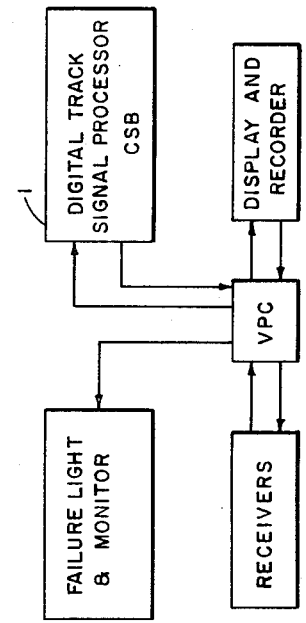

Stanley A. Fierston
Bruce K. Nelson,
INVENTORS.

Stanley A. Fierston
Bruce K. Nelson,
  INVENTORS.

VIDEO PULSE CONVERTER FOR THE TRACK SIGNAL PROCESSOR

In a track signal processor, two major subsystems are present: the digital track signal processor and the video pulse converter. A satisfactory digital track processor is found in the UNIVAC computer. However, there is a need for satisfactory video pulse converter. The video pulse converter (VPC) must generate range gates for verification acquisition, verification track, precision track, and discrimination. Also, the VPC must integrate received analog video information and convert it into digital form. These operations are to be performed on command from a control switch and buffer unit for each track or acquisition return received. Further, a test target must be generated by the VPC so as to check the radar system.

It is an object of this invention to provide a video pulse converter which will generate range gates for target tracks and will generate test targets.

A further object of the present invention is to provide proper integration of information received in a video pulse converter.

A still further object of the invention is to provide a video pulse converter which will perform its operations on command from a control switch and buffer unit.

In a radar system such as the ZMAR-X/WS system, a single tracking beam must process and track a large number of targets. Therefore, it is necessary to time-share the beam, receiver, and signal processing circuitry between all targets. The video pulse converter (VPC) of this invention allows this to occur. The VPC processes each individual track pulse as it is received and converts the desired information to digital form. Broadly, the operations performed by the VPC are: generation of range gates for verification acquisition, verification track, precision track, and discrimination; the integration of received video; and the conversion of the integrated video to digital form. These operations are performed for each track or acquisition return received on command from the control switch and buffer (CSB) of the digital track processor.

The invention further resides in certain novel features of construction, combinations, and arrangements of parts. Further objects and advantages of the invention will be apparent to those skilled in the art to which it pertains, from the following description of the preferred embodiment thereof described with reference to the accompanying drawing, which forms a part of the specification, and wherein the same reference characters represent corresponding parts throughout the drawing, and in which:

FIG. 2 shows in block diagram the connections between the video pulse converter and the overall radar system;

FIG. 5 shows a schematic diagram illustrating a typical video channel;

Figure 1:
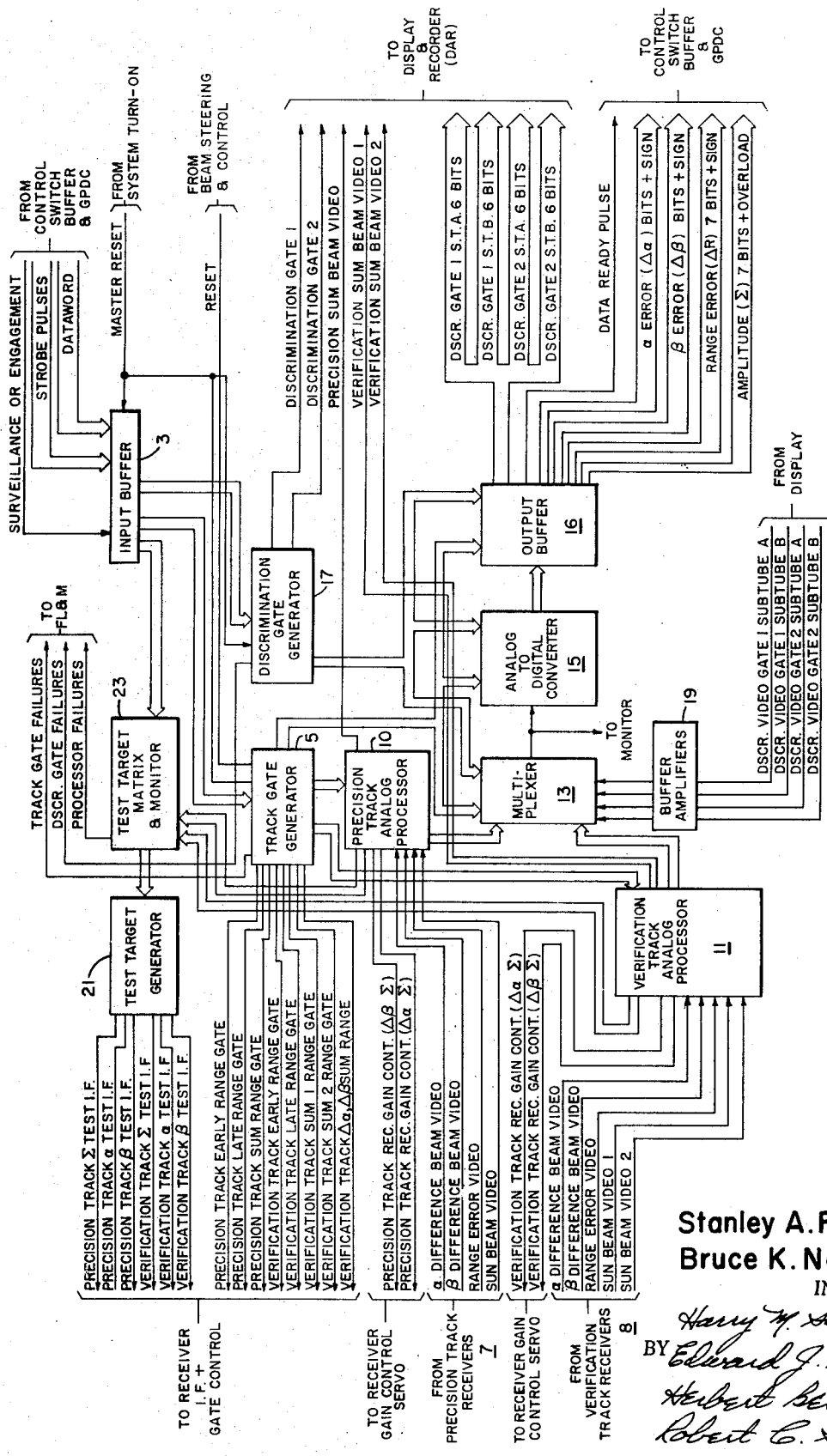
FIG. 1 illustrates the video pulse converter interface in block diagram.

The specific interface block diagram of the video pulse converter (VPC) is shown in FIG. 1. FIG. 2 shows, broadly, the connections of the video pulse converter to other units of the radar system. The digital track signal processor 1 is a general purpose computer having a control switch and buffer (CSB) unit to communicate with the VPC.

Referring to FIG. 1, the sequence of operation performed upon a video pulse may follow. First, an input is received from the CSB by the input buffer 3. This input designates the arrival time of a pulse to be processed. The track gate generator 5, upon receipt of this information, generates range gates and sends them to the receiver. The receiver's outputs 7 and 8 are integrated by processors 10 and 11 in order to obtain measures of their pulse energies. After integration, the measured pulse energies are sent by way of the multiplexer 13 to the analog to digital converter 15 where they are converted to digital form. They are then read out to the display and recorder units by output buffer 16.

Since there are differences between the precision track and the verification track pulse widths, two analog processors are used to integrate the signals for these two functions. An instruction initiated by the CSB designates the particular processor to be used. Discrimination range gates are also generated by discrimination gate generator 17 on command from the CSB. These are transmitted directly to the display and recorder units (DAR) where the discrimination returns are processed preparatory to display and recording. Discrimination video is also returned through buffer amplifiers 19 and multiplexer 13 to converter 15 for digital encoding. The resultant digital words are routed back to the displays for recording and ultimate transmittal to the CSB.

Figure 10:
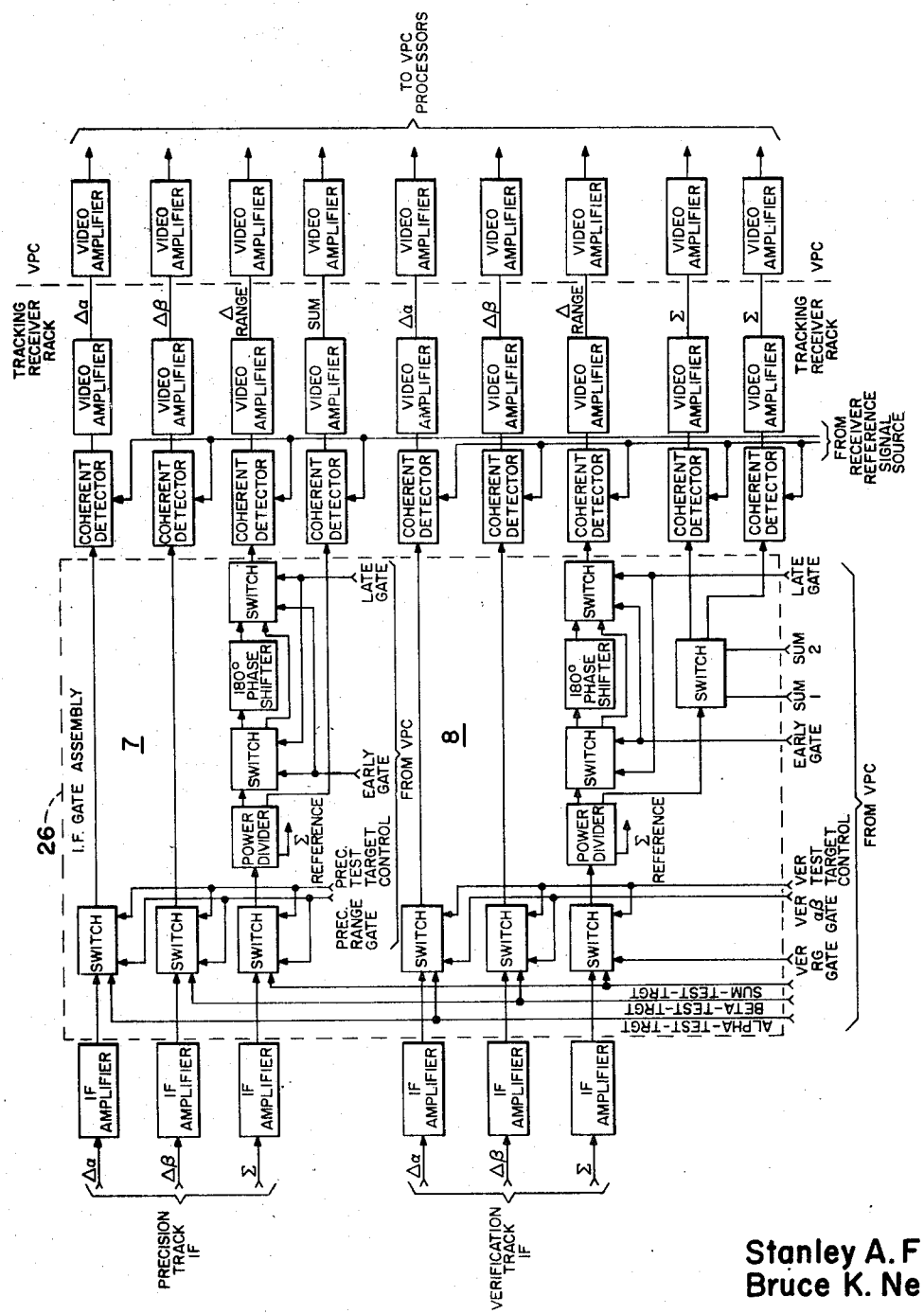
FIG. 10 shows in block diagram the interface between the video pulse converter and the I. F. gate assembly of the receivers.

The VPC also contains a test target generator 21. The test target generator produces a set of test target signals for online VPC monitoring. A desired test is selected and requested by a general purpose digital computer (GPDC), and is fed through the CSB. This is fed to target generator 21 by way of test target matrix and monitor 23. The target generator produces the 30 megacycle $\Delta\alpha, \Delta\beta$, and $\Sigma$ signals with the desired amplitude and phase as requested through the CSB. These signals are sent to the receivers (see FIG. 10 in conjection with FIG. 1) and then sent back by the receivers for detection and conversion by the VPC. The GPDC of the digital track signal track processor ultimately compares the received word fro the output buffer 16 with the original test target request. Any difference in the two in used to activate a fault alarm, not shown. The target generator matrix and monitor 23 is employed for two purposes: first, to translate coded CSB target requests into the proper from for target generator activation; second, to logically combine the various monitoring signals produced in the analog portion of the VPC. The monitoring equipment will signal the fault location system of a VPC failure and its location should one occur.

Although not part of the VPC proper, the I. F. gating assembly 26 (see FIG. 10) has been modified to perform a part of the overall VPC task. It comprises all of the I. F. gates required to time-select a precision or verification track target. Physically, the I. F. gating assembly is located with the track receivers; functionally, however, it is directly under VPC control.

Input buffer 3 forms the main controlling interface between the CSB and the VPC. The input buffer consists of two functional sections, a buffer and an address decoder. A 24 bit jam transfer register and logic is used therein for decoding 4 address lines. The 24 bit word and four strobe pulses are employed to operate the VPC in the proper mode at the proper time. Buffer outputs, after minor processing, are distributed to various portions of the VPC. The address decoder section will decode one of four strobe pulses and generate trigger pulses to start processing in either discrimination or tracking of data received at the buffer. The entire assembly is packaged as a 2 C plane D unit.

Figure 3:
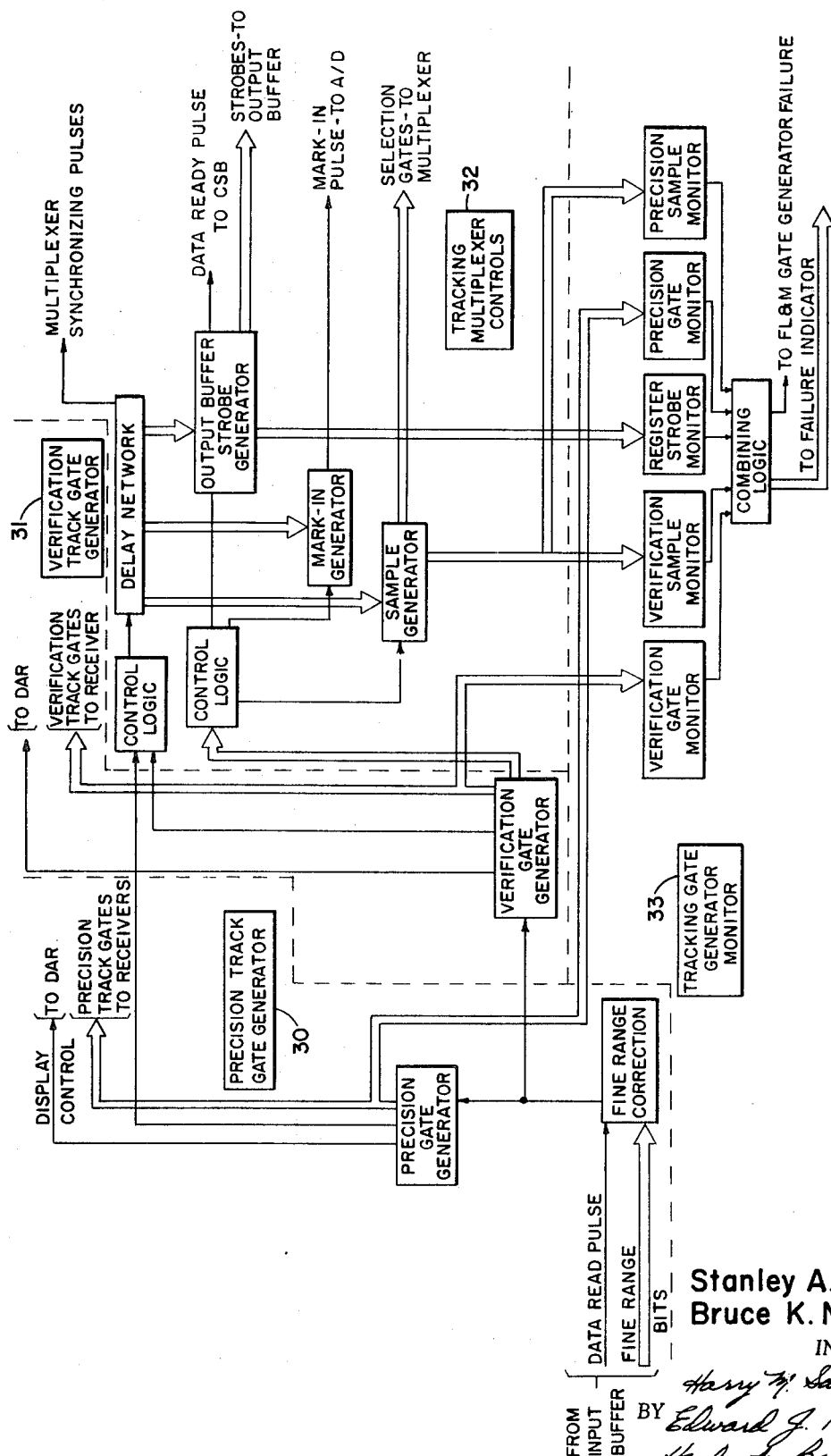
FIG. 3 illustrates the tracking gate generator in block diagram.

Track gate generator 5 (FIG. 1) generates and distributes all timing signals used by the receiver and VPC to process a track pulse return. These timing signals determine the time position and length of all range gates. FIG. 3 shows the tracking gate generator in greater detail. Referring to FIG. 3, it can be seen that the tracking gate generator is comprised of four units: precision track gate generator 30, verification gate generator 31, tracking multiplexer controls 32, and tracking gate generator monitor 33.

The precision track gate generator 30 provides fine range correction for the ordered range time and the range gates necessary for processing precision tracking video. Precision track gate generator 30 also provides the range gates used in the receiver subsystem for passing precision track video to the VPC.

The verification gate generator 31, FIG. 3, provides all range gates necessary for transferring verification video from the receiver subsystem to the VPC. A verification gate trigger is generated for distribution to the display and recorder (DAR) to indicate the leading edge of verification video pulses. Both the precision track generator and the verification gate generator supply signals to the tracking multiplexer controls and the tracking monitor for controlling channel processing and for monitoring the tracking gate generator. Verification tracking performs the same function as precision tracking; except that the target return is uncompressed and uncoded.

Tracking multiplexer controls 32, depending on which control signals have been received from the precision track and verification gate generators, provides the proper sample pulses to gate the tracking video into multiplexer 13 (FIG. 1).

Tracking gate generator monitor 33 accepts monitor and control signals from the precision track gate generator, verification gate generator, and the tracking multiplexer controls. The various gates and control pulses are monitored at discrete times as determined by the mode in which the VPC is operating. In the event of a failure within the tracking gate generator, appropriate failure lights on the VPC control panel will be enabled.

Figure 4:
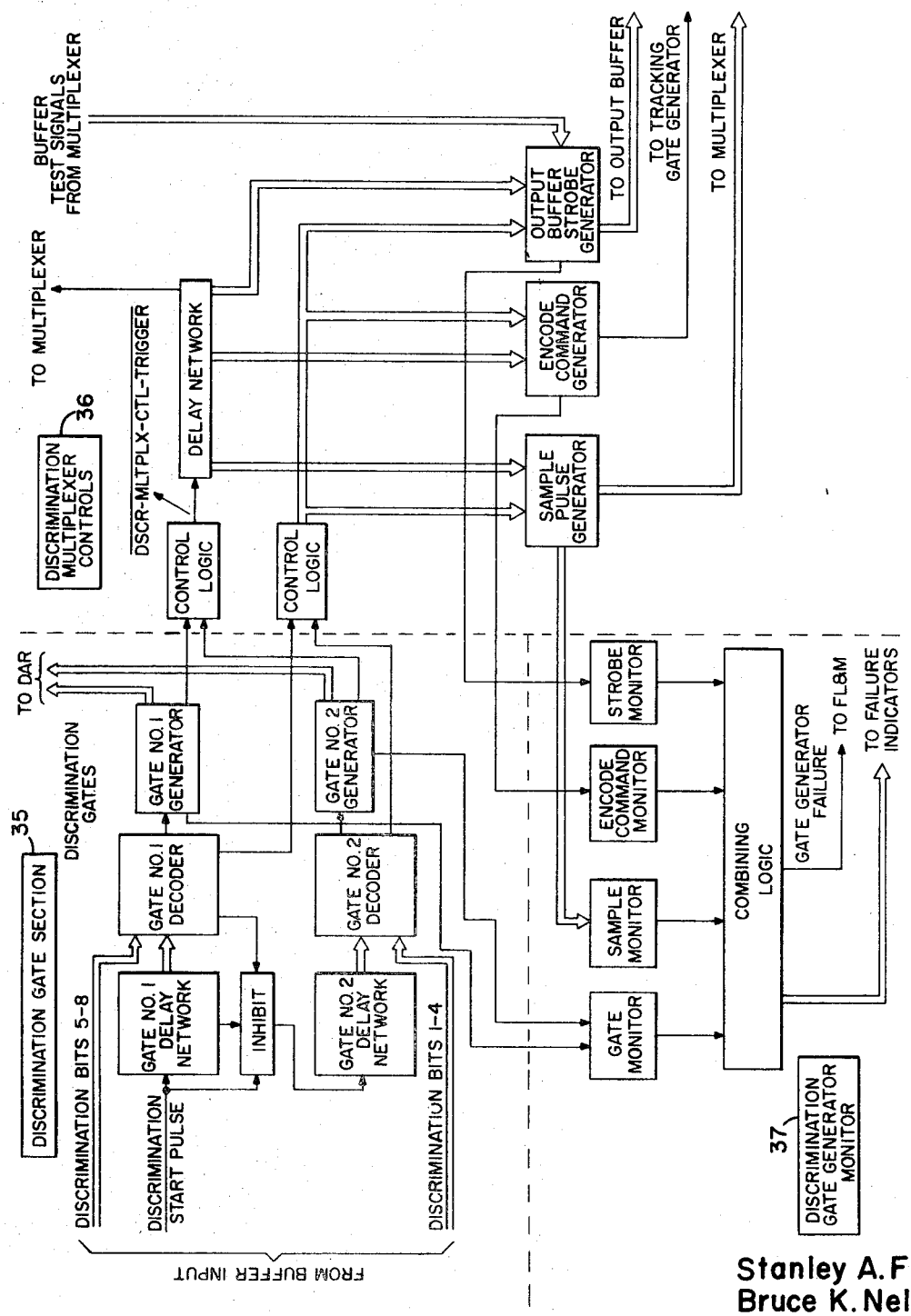
FIG. 4 is a block diagram of the discrimination gate generator.

Discrimination gate generator 17 of FIG. 1 operates in a manner similar to that of the track gate generator. Output gates in this case are routed to DAR to gate the portion of the discrimination video corresponding to a tracked target. The generation of most gate and control signals is monitored by a portion of the gate generator logic. FIG. 4 shows that the discrimination gate generator comprises three separate sections: the discrimination gate section 35, the discrimination multiplexer controls 36, and the discrimination gate generator monitor 37.

The discrimination gate section 35 generates the actual discrimination gates which the DAR subsystem uses to gate the discrimination video into that equipment. The discrimination gate section also produces control signals used by the multiplexer controls and the discrimination gate monitor.

The multiplexer controls 36, depending on which control signals have been received from the discrimination gate section, provides the proper sample pulses to gate the expanded discrimination video into the multiplexer, produces 200 nanosecond synchronizing pulses for the multiplexer, and generates the encode command which samples the output of the multiplexer. Other signals which are generated within this section are strobe pulses which sample the output of the analog-to-digital converter and load the proper section of the output buffer.

Discrimination gate generator monitor 37 accepts signals from discrimination gate section 35 and multiplexer controls 36. These signals are monitored, and, in the event of a failure within the discrimination gate generator, they will light an appropriate failure light on the VPC control panel.

The precision and the verification track analog processors 10 and 11 of FIG. 1 are employed in the VPC for conversion of receiver video to a form suitable for conversion by analog to digital converter 15. Each processor is comprised of a number of similar processing units called video channels. FIG. 5 shows one of the video channels. It consists of a video amplifier 39, an integrator 40, a quench circuit 41, and a buffer amplifier 42.

The video amplifier 39 provides power gain for the coherent detected signals from the receiver subsystem. The integrators accept the video pulse inputs (which are bipolar) from the video amplifier and provide an output voltage equal to the product of the integrator gain constant times the volt-time area of the video pulse. After the pulse integration period, the integrator is required to maintain the integrated voltage level for a specified hold time.

Associated with the integrator circuits 40 are the quench or integrator capacitor discharge circuits 41. The function of the quench circuit is to provide a means for discharging the residual charge that may exist across the integrating capacitor 43 in the feedback paths of the operational amplifier integrator. The quench operation is performed prior to the receipt of a video pulse to be integrated. By this quench operation, the integrator output is set to zero volts at the start of video pulse integration. During the integration and hold cycle of integrator operation, the quench circuit is deactivated and appears as a very high-impedance shunt across the feedback capacitor. During the quench interval, the quench circuit is activated and permits the residual charge of the feedback capacitor to be discharged.

The buffer amplifier 42 provides isolation between the integrator circuits and the multiplexing medium for AC converter 15. Gain adjustments are incorporated in the buffer amplifiers to permit adjustments and trimming of the individual video channel overall gain for calibration purposes. The buffer amplifiers also present a relatively high-load impedance for the integrator circuits and provides a low-output driving source impedance for the AC converter through the multiplexer switches.

The video channel equipment is utilized in the verification tracking and precision tracking channels in the VPC. Five sets of video channels comprise the five verification tracking channels with four sets of video channel equipments comprising the four precision tracking channels. The parameters processed by the analog processing equipments in both the verification and precision tracking channels are sum channel, the alpha difference channel, the beta difference channel, and the range error channel. The verification tracking channels include two sum channels. The dual sum channels are required to permit processing of contiguous signals that may occur in verification acquisition for the search and engagement modes. To permit integration of the second signal while simultaneously holding the integrated value of the first signal for encoding, necessitates the dual sum channels.

Figure 6:
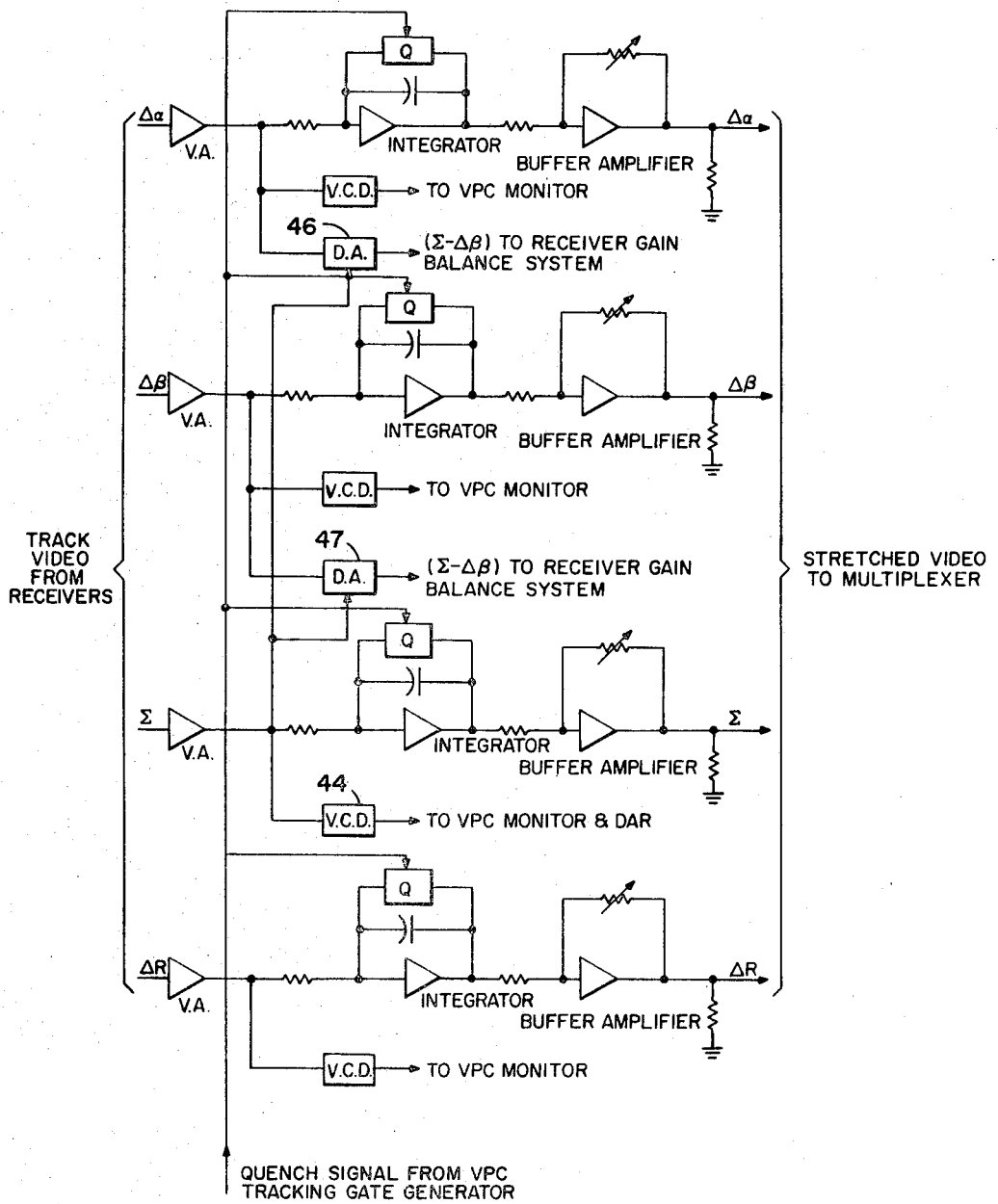
FIG. 6 illustrates the precision track analog processor block diagram.

FIG. 6 illustrates a set of video channels connected to form precision track analog processor 10. A specific showing of the verification track processor 11 is not shown as it is essentially identical except for the addition of a second sum channel. A number of new elements will be noticed in the processor block diagram of FIG. 6. Each video channel has associated with it a video cable driver 44 (V.C.D.) for the purpose of routing test signals to the VPC monitoring equipment. The sum channel video is also sent to DAR for display of both real and test signals. Two differential amplifiers 46 and 47 (D.A.) are also associated with each processor so as to derive a difference signal for operation of the receiver gain balance system.

Nine stretched tracking video signals must be converted to digital form in the VPC prior to transmission to the CSB and the general purpose computer. Added to these are four expanded discrimination video signals from the DAR equipment which also are to be encoded. A total of 13 signals must, therefore, be routed to the VPC analog to digital converter 15. This requirement introduces the need for a time multiplexing device for sequentially injecting the 13 signals into a single, high-speed A/D converter. This is done by multiplexer 13, FIG. 1, which acts to combine the analog processor track video signals and the discrimination video signals onto a single line for ultimate encoding by the analog to digital converter. Control of the multiplexer is derived from the track and discrimination gate generators. A set of manual controls, not shown, is provided to enable the localization of a faulty multiplexer switch when the automatic testing process indicates a VPC failure.

The analog to digital converter 15 (FIG. 1) accepts the single, time-shared multiplexer's outputs for conversion of the voltage levels to digital form. It is utilized by the VPC to transmit to the CSB, in digital form, the parameters of the receiver's signals. Discrimination video from the DAR equipment is also processed by the A/D and routed back to DAR for display purposes and ultimate transmission to CSB. Various combinations of these parameters are processed during the different operational modes of the VPC.

The function of output buffer 16 is to accept a digital output word from A/D converter 15 and to store this word briefly in a specified section of its register until such time as it is required by the CSB and/or DAR. The output buffer accepts a maximum of nine parallel A/D output bits at one time and assembles them into two words. The first, a track word is routed to the CSB after all data for one target has been assembled. The second word, containing discrimination data is sent to the DAR equipment for further processing.

Figure 7:
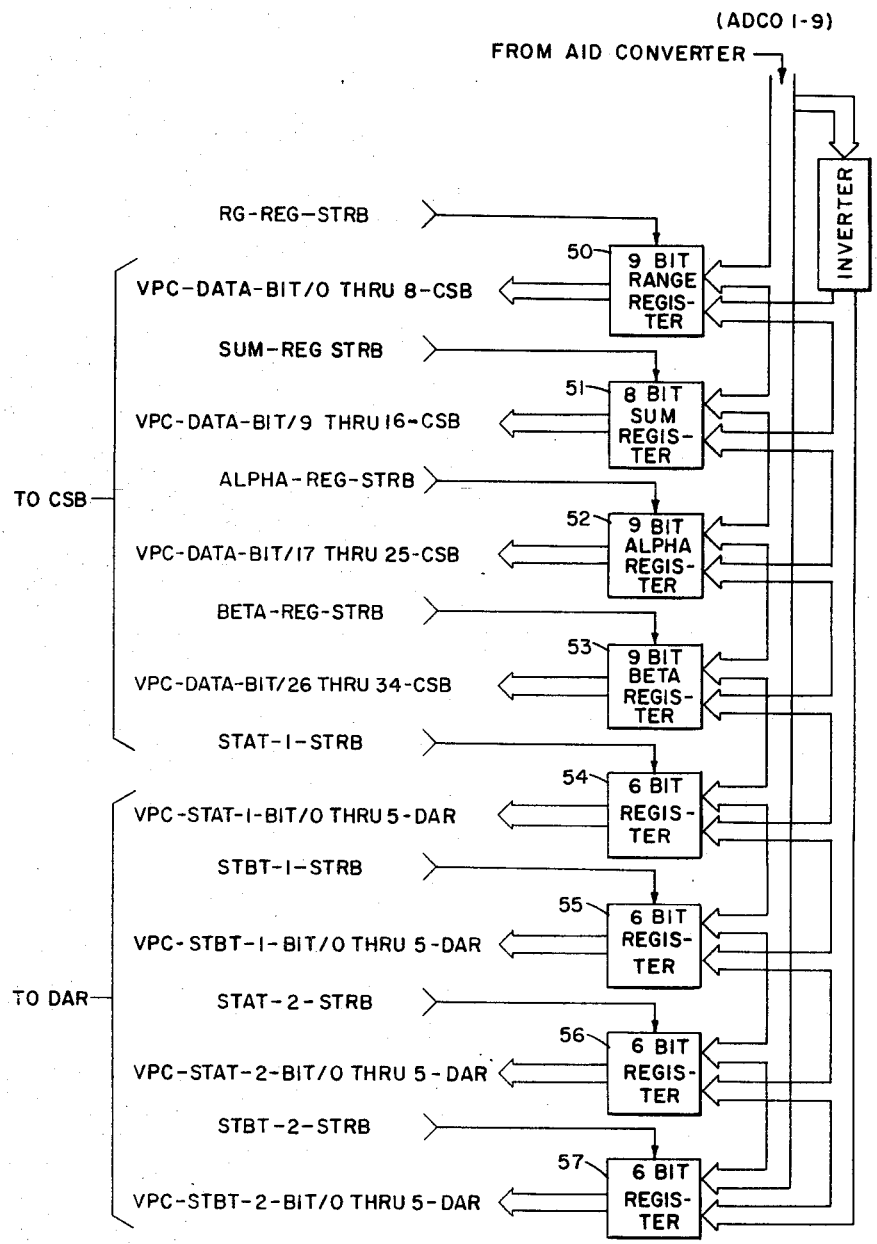
FIG. 7 shows the block diagram of the output buffer.

The output buffer 16 is comprised of eight multibit registers 50-57 (see FIG. 7). To load each register with the correct data at a specified time requires eight discrete register strobe pulses. These strobe pulses are controlled by the discrimination and tracking multiplexer controls and are distributed to the buffer in the proper sequence. Input data is fed to the buffer on nine lines (ADCO 1-9) from the A/D converter. The data is routed to the correct register by one of the strobe pulses. ADCO 1-7 are target information bits with 1 being the least order bit; ADCO—8 is the sign bit, and ADCO—9 is the overload bit. The output buffer is contained in a 3 C plane D unit.

Figure 8:
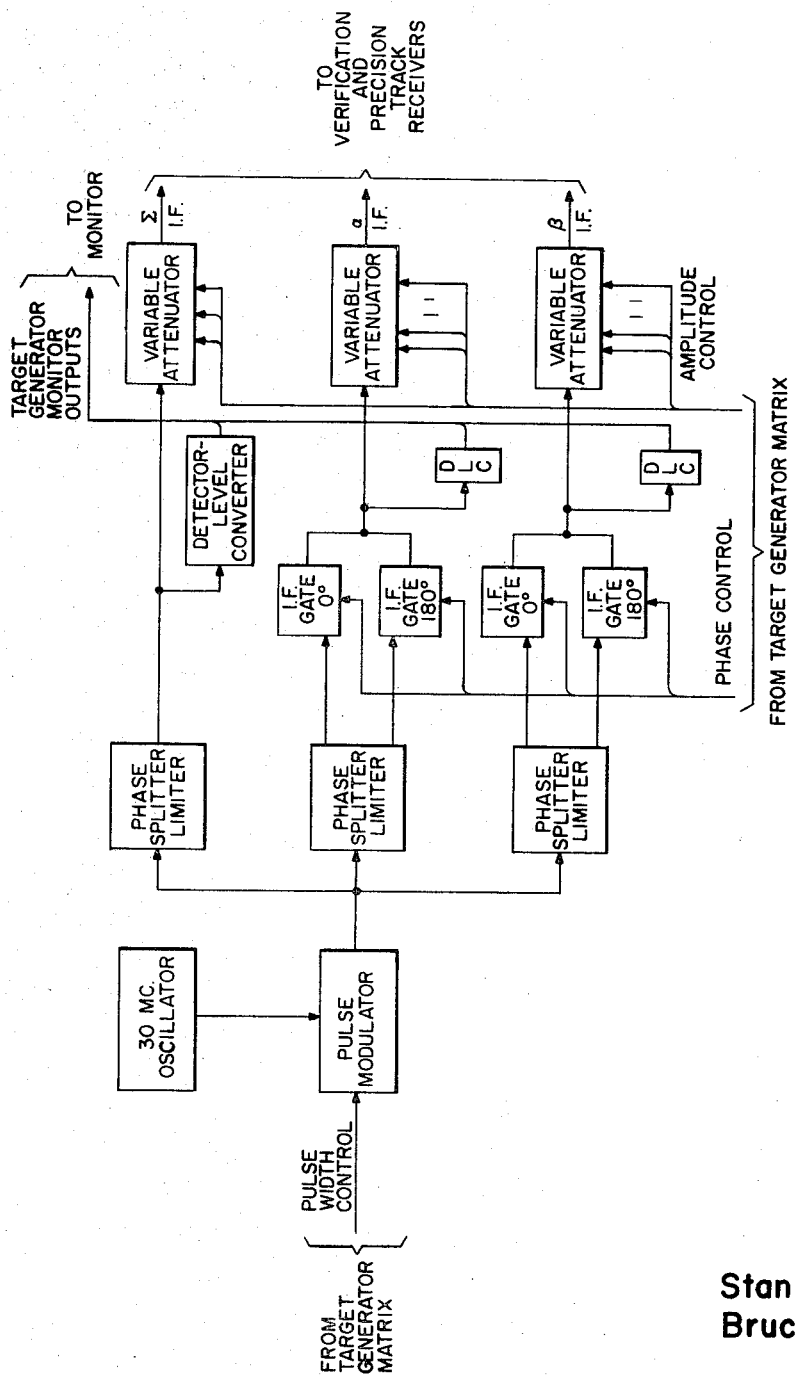
FIG. 8 illustrates in greater detail a block diagram of the test target generator.

The function of target generator 5 (FIG. 1 is two fold: 1) to aid in locating a catastrophic failure to the smallest replaceable unit of the VPC through the use of monitor circuitry, contained in the VPC; and 2) to provide test signals for detecting VPC faults of a drift of calibration nature. In performing these functions, the target generator will generate noise-free test targets upon request of GPDC which will be inserted into the tracking receivers. In certain of the tests, targets will be monitored as they propagate through the VPC analog processing channels to detect catastrophic failures. The digital output of the VPC will also be monitored in the GPDC by comparison with a predetermined digital answer to a particular test target request. The test target generator contains the major equipment groups shown in FIG. 8.

Figure 9:
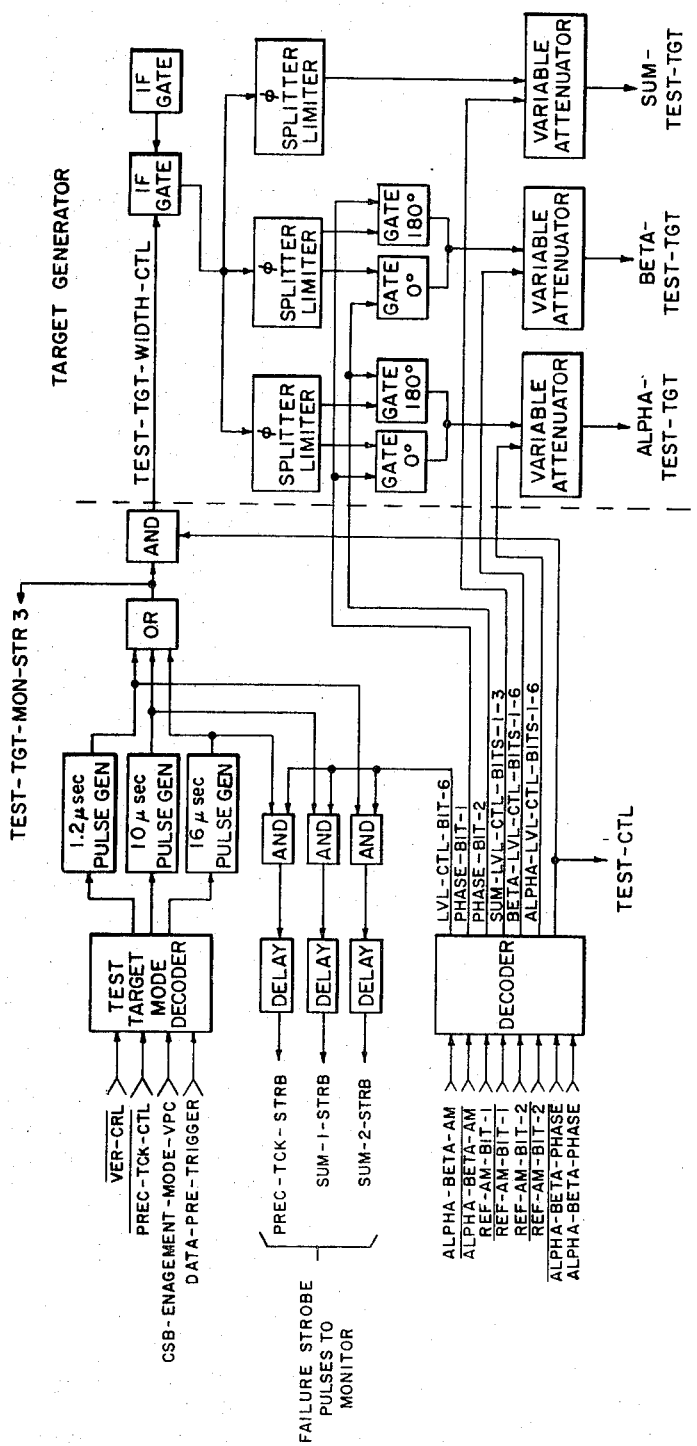
FIG. 9 shows the target generator matrix in block diagram.

To keep a complex equipment such as the VPC in continuous working order, it is necessary to process test targets through the system and then monitor input and output lines to determine if failures have occurred, and if so, their location. The target generator matrix 23 is shown in block diagram on FIG. 9. It controls the width, amplitude and phase relationship of the alpha, beta, and sums signals, representing a test target, which are distributed to the receiver subsystem for VPC testing. The matrix also provides levels to enable test functions throughout the VPC and a reset for the monitoring circuitry. The target generator monitor is a local failure detector mechanism for VPC video tests. Absolute failures of the input and output lines will be indicated but only under conditions of maximum test target amplitude. A secondary function of the monitor is to provide failure indication during receiver precision track phase and gain balancing. This test, together with other information available to the fault location subsystem, will permit localization of a gross failure to the receiver/pulse-compression areas.

The test target monitor 23 is used to monitor the outputs of the receivers, the test target generator, and video signals within the VPC. Test targets are monitored when the system is active by range ordering tests during the time in which true target returns are not expected. The monitor unit basically operates by receiving properly timed pulses from the circuits being monitored. In certain cases, the pulses are only produced if an error has occurred; in others, such as the target generator, a pulse indicates that all is operating normally. The various pulse sets are combined in the monitor logic and used to set error flip-flops. These flip-flops, temporarily, retain and transmit an error indication to the fault location subsystem.

While the invention has been described with reference to a preferred embodiment thereof, it will be apparent that various modifications and other embodiments thereof will occur to those skilled in the art within the scope of the invention. Accordingly, it is desired that the scope of the invention be limited only by the appended claims.

We claim:

1. A converter system comprising: two processor means having inputs connected to receive different groups of analog signals from a plurality of received analog signals; a time sharing means; said processor means having outputs connected to inputs of said time sharing means; an analog to digital converter means having outputs; utilization means connected to said outputs of said converter; said time sharing means having an output in which said output signals of said processor means are fed one at a time to said converter means for conversion to a form usable by said utilization means; gate generating means connected to said processor means, said time sharing means, and said converter means so as to control the operation of these means; said time sharing means comprising a multiplexer whose timing is controlled by said gate generating means; wherein said plurality of received signals are radar return pulses which are derived from a radar receiver unit, and said gate generating means being connected to the receiver unit so as to provide range gates thereto.

2. A converter system comprising: a radar receiver unit for receiving a plurality of signals which are radar returns an integrating means having inputs connected to receive said signals, a time sharing means, said integrating means having outputs connected to inputs of said time sharing means, a converter means, said time sharing means having an output in which said output signals of said integrating means are fed one at a time to said converter means for conversion to a form useable to means connected to outputs of said converter means, gate generating means connected to said integrating means, said time sharing means, and said converter means so as to control the operation of these means, and a test target generator which is connected to said radar receiver unit whereby said receiver unit can selectively supply an input of said receiver unit with test target signals.

3. A converter system as set forth in claim 2, wherein said test target generator is controlled by a radar computer means, and wherein said computer means is connected to outputs of said converter means for comparison of the outputs of the converter means and a selected test target.

4. A converter system as set forth in claim 3, wherein said computer means controls the operation of said gate generating means, and said time sharing means is a multiplexer whose timing is controlled by said gate generating means.

5. A converter system as set forth in claim 4, wherein said converter means is an analog to digital converter, and further comprising display and recording units connected to outputs of the converter.

6. A converter system as set forth in claim 5, wherein said gate generating means is connected to the receiver unit so as to provide range gates thereto.

* * * * *